US012632317B2

(12) United States Patent
Strein et al.

(10) Patent No.: US 12,632,317 B2
(45) Date of Patent: May 19, 2026

(54) PRIORITY-BASED PRODUCTION LOAD BALANCING

(71) Applicant: Disney Enterprises, Inc., Burbank, CA (US)

(72) Inventors: Michael J. Strein, Bohemia, NY (US); Ryan N. McCormick, Blauvelt, NY (US); Benjamin H. Kepler, Palisades, NY (US)

(73) Assignee: Disney Enterprises, Inc., Burbank, CA (US)

( * ) Notice: Subject to any disclaimer, the term of this patent is extended or adjusted under 35 U.S.C. 154(b) by 530 days.

(21) Appl. No.: 17/476,385

(22) Filed: Sep. 15, 2021

(65) Prior Publication Data

US 2023/0077580 A1     Mar. 16, 2023

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 7,475,106 B2 * | 1/2009 | Agnoli | .................. | H04L 65/762 |
| | | | | 709/201 |
| 7,577,667 B2 * | 8/2009 | Hinshaw | ............... | G06F 16/273 |

| | | | | |
|---|---|---|---|---|
| 11,057,654 B1 * | 7/2021 | Vegas | ..................... | H04L 65/75 |
| 2006/0190576 A1 * | 8/2006 | Lee | ......................... | G06Q 30/02 |
| | | | | 709/225 |
| 2008/0239949 A1 * | 10/2008 | Nishizaki | ............ | H04L 49/3081 |
| | | | | 370/395.42 |
| 2008/0285578 A1 * | 11/2008 | DeLay | .................... | H04L 67/63 |
| | | | | 370/389 |
| 2009/0183218 A1 * | 7/2009 | Li | ...................... | H04N 21/2405 |
| | | | | 725/114 |
| 2010/0281178 A1 * | 11/2010 | Sullivan | ............. | H04N 21/2668 |
| | | | | 709/245 |

(Continued)

OTHER PUBLICATIONS

U.S. Appl. No. 16/983,063, filed Aug. 3, 2020, Strein et al.
U.S. Appl. No. 17/319,350, filed May 13, 2021, Strein et al.
U.S. Appl. No. 17/466,932, filed Sep. 3, 2021, Strein et al.

*Primary Examiner* — Abu Zar Ghaffari
(74) *Attorney, Agent, or Firm* — Farjami & Farjami LLP

(57)     ABSTRACT

There is provided a load balancer including a computing platform having processing hardware and a memory storing a software code. The processing hardware is configured to execute the software code to receive production data describing a media workflow, determine, using the production data, a priority status of the media workflow, identify production resources for processing the media workflow, and allocate, based on the priority status, one or more of the production resources to processing of the media workflow. In some implementations, the priority status is determined based on the type of content included in the media workflow. Moreover, in some implementations, the priority status is determined further based on a distribution schedule of a content feed corresponding to the media workflow.

21 Claims, 5 Drawing Sheets

(56)                References Cited

U.S. PATENT DOCUMENTS

| | | | | |
|---|---|---|---|---|
| 2013/0290537 A1* | 10/2013 | Shaw | H04W 28/0861 | 709/226 |
| 2013/0318034 A1* | 11/2013 | Bawa | G06F 16/27 | 707/602 |
| 2014/0115036 A1* | 4/2014 | Lai | H04L 67/08 | 709/203 |
| 2014/0267571 A1* | 9/2014 | Periyannan | H04L 12/1827 | 348/14.08 |
| 2014/0270717 A1* | 9/2014 | Chen | H04N 21/4334 | 386/299 |
| 2015/0089016 A1* | 3/2015 | Jellison, Jr. | H04N 21/8456 | 709/217 |
| 2015/0160891 A1* | 6/2015 | Beeson | G06F 3/0613 | 711/117 |
| 2015/0358472 A1* | 12/2015 | Rosenberg | H04M 3/5238 | 370/235 |
| 2016/0260123 A1* | 9/2016 | Mishra | G06Q 30/0244 | |
| 2017/0026294 A1* | 1/2017 | Basavaraja | H04L 69/22 | |
| 2017/0070567 A1* | 3/2017 | Lee | H04L 67/1008 | |
| 2017/0149875 A1* | 5/2017 | Iyengar | H04L 47/83 | |
| 2017/0208365 A1* | 7/2017 | Phillips | H04N 7/17318 | |
| 2020/0106708 A1* | 4/2020 | Sleevi | H04L 65/80 | |
| 2020/0162959 A1* | 5/2020 | Radlein | H04L 43/20 | |
| 2020/0314004 A1* | 10/2020 | Rashad | H04L 45/74 | |
| 2020/0403972 A1 | 12/2020 | Strein et al. | | |
| 2020/0404033 A1 | 12/2020 | Strein et al. | | |
| 2020/0404034 A1 | 12/2020 | Strein et al. | | |
| 2020/0404035 A1 | 12/2020 | Strein et al. | | |
| 2021/0099745 A1* | 4/2021 | Lee | H04N 21/2187 | |
| 2021/0112116 A1* | 4/2021 | Baccour | H04N 21/262 | |
| 2021/0240172 A1* | 8/2021 | Srivastava | G05B 19/41865 | |
| 2021/0279103 A1* | 9/2021 | Herath | G06F 9/5005 | |
| 2021/0406090 A1* | 12/2021 | Dimitrov | G06F 9/4881 | |
| 2022/0308925 A1* | 9/2022 | Shilane | H04L 67/1023 | |
| 2023/0066956 A1* | 3/2023 | Sen | H04N 21/44209 | |

* cited by examiner

Receiving production data describing
a media workflow

491

Determining, using the production data, a
priority status of the media workflow

492

Identifying multiple production resources for
processing the media workflow

493

Allocating, based on the priority status,
one or more of the identified production
resources to processing of the
media workflow

494

PRIORITY-BASED PRODUCTION LOAD BALANCING

BACKGROUND

Load balancing techniques attempt to optimize the use of available computing resources. Conventional load balancing relies on data provided by computing systems, as well as the capacity of those systems, and attempts to distribute a workload so as to make the most efficient use of the available environment subject to those constraints. Common load balancing algorithms look at connections between servers, response times, bandwidth capacity, and the like, when directing workload traffic. That is to say, conventional load balancing techniques tend to focus exclusively on the compute environment while being indifferent to the sources or types of workflows.

In contrast to the computational environments serviced by conventional load balancing techniques, media and broadcast environments require that not all workflows be treated equally. Often, especially important programming, coverage of live events, or "breaking news" take priority over other regularly scheduled or other pre-recorded programming. However, as noted above, conventional load balancing solutions are unresponsive to the nature of the workloads being distributed for processing.

BRIEF DESCRIPTION OF THE DRAWINGS

FIG. 3 shows a diagram of an exemplary production control room in communication with the priority-based production load balancer shown in FIG. 2, according to one implementation;

DETAILED DESCRIPTION

Figure 1:
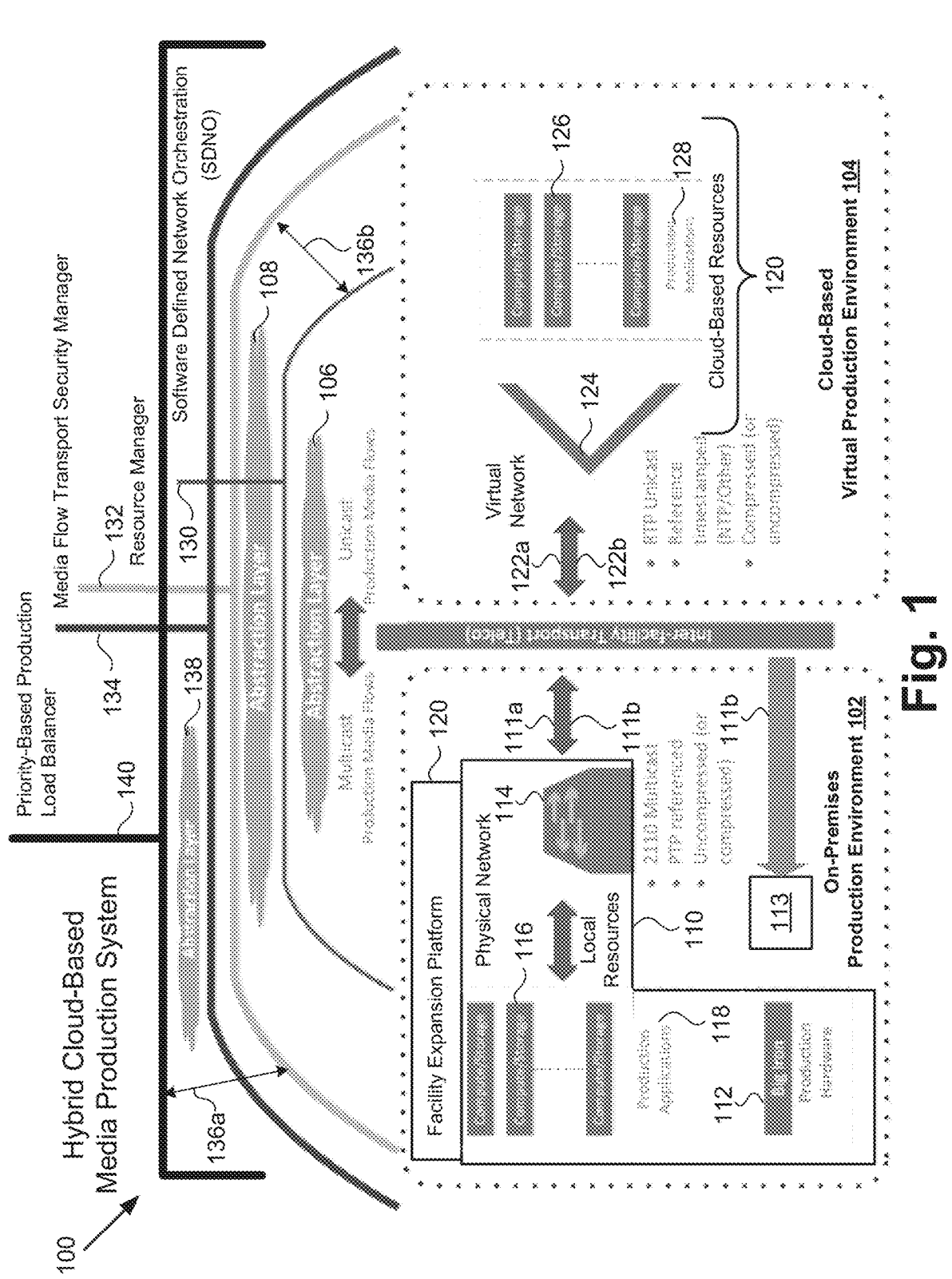
FIG. 1 shows a diagram of an exemplary hybrid cloud-based media production system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing priority-based production load balancing that overcome the drawbacks and deficiencies in the conventional art. In one implementation, the priority-based production load balancing solution disclosed by the present application is configured to support a hybrid local/cloud-based production system. Exemplary hybrid local/cloud-based production systems are described in U.S. patent application Ser. No. 16/869,137, titled "Hybrid Cloud-Based Media Production." and filed on May 7, 2020, and U.S. patent application Ser. No. 16/869,203, titled "Extensible Resource Management for Hybrid Cloud-Based Media Production." and filed on May 7, 2020. These patent applications are hereby incorporated fully by reference into the present application. The comprehensive control over management of the production media flows for such a system, commonly known as Software Defined Network Orchestration (hereinafter "SDNO") is performed by a network orchestrator of the system (hereinafter "SDNO"). That SDNO, as well as a resource manager, are configured to extend seamlessly between the local and cloud-based "virtual" production environments to enable a highly scalable and dynamic media production solution.

It is noted, that as used in the present application, the expression "hybrid cloud-based media production" may refer to brick-and-mortar production facilities that are extensible into the cloud so as to include cloud-based virtual production resources, as well as to production systems relying entirely or substantially on virtual media processing resources. Consequently, the expressions "hybrid cloud-based media production" and "cloud-extensible media production" may be used interchangeably in the present disclosure. It is further noted that the hybrid cloud-based media production system referenced in the present application is cloud agnostic, i.e., not specifically designed for implementation in a particular type of cloud environment. Consequently, the cloud virtual production environment into which such a hybrid system expands may include multiple distinct cloud environments, and thus may be a multi-cloud virtual production environment.

It is also noted that the production media flows described in the present application may include audio-video (AV) content in the form of live feeds, video games, movies, or episodic television (TV) content that includes episodes of TV shows that are broadcast, streamed, or otherwise available for download or purchase on the Internet or via a user application. Moreover, the priority-based production load balancing solution disclosed herein may advantageously be performed as an automated process.

As defined in the present application, the terms "automation," "automated," and "automating" refer to systems and processes that do not require the participation of a human user, such as a human system administrator. For example, although in some implementations a human system administrator may review the performance of the priority-based production load balancing disclosed herein, that human involvement is optional. Thus, the processes described in the present application may be performed under the control of hardware processing components of the disclosed systems.

FIG. 1 shows exemplary hybrid cloud-based media production system 100, according to one implementation. As shown in FIG. 1, hybrid cloud-based media production system 100 includes on-premises production environment 102 interactively linked to cloud-based virtual production environment 104. As shown in FIG. 1, on-premises production environment 102 includes local resources 110 communicatively coupled to facility expansion platform 120 and generating multicast production media flows 111a. Local resources 110 may include "big iron" production hardware 112 in the form of dedicated custom and proprietary hardware assets, local physical production network 114, local computing and data storage resources 116, and local production applications 118.

In addition. FIG. 1 shows SDNO 130, resource management system 132 (hereinafter "resource manager 132"), media flow transport security manager 134, and priority-based production load balancer 140. Also shown in FIG. 1 are abstraction layer 106 associated with SDNO 130, abstraction layer 108 associated with resource manager 132, and abstraction layer 138 associated with priority-based production load balancer 140, as well as communication links 136*a* between priority-based production load balancer 140 and resource manager 132, which may be provided by an application programming interface (API) (hereinafter "resource manager API 136*a*"), and communication links 136*b* between resource manager 132 and SDNO 130, which may be provided by another API.

With respect to abstraction layer 106 associated with SDNO 130, abstraction layer 108 associated with resource manager 132, and abstraction layer 138 associated with priority-based production load balancer 140, it is noted that an abstraction layer is a series of software services (often called microservices) providing and accomplishing specific functions, as known in the art. Abstraction layer 138 supports both "east/west" lateral communications between other software services and "north/south" vertical communications between the layers that call these services for priority-based production load balancer 140, while abstraction layers 106 and 108 provide analogous communications support for SDNO 130 and resource manager 132, respectively.

Cloud-based virtual production environment 104 includes cloud-based resources 120 configured to receive and process cloud production media flows 122*a* corresponding to multicast production media flows 111*a*, thereby producing post-production cloud media flows 122*b*. As shown in FIG. 1, cloud-based resources 120 include cloud bandwidth 124, cloud-based computing and data storage resources 126, and cloud-based production applications 128. Also shown in FIG. 1 is physical, i.e., not cloud-based or virtual, post-production facility 113 receiving post-production multicast media flows 111*b* corresponding to post-production cloud media flows 122*b*.

It is noted that physical post-production facility 113 may be another production facility similar to on-premises production environment 102, or may be a media distribution hub, such as a regional affiliate or other affiliated media distributor. It is further noted that post-production multicast media flows 111*b* correspond to post-production cloud media flows 122*b* after post-production media flows 122*b* are converted from a cloud permissible media flow type, such as unicast, to multicast. It is further noted that cloud production media flows 122*a* are processed to generate post-production cloud media flows 122*b* using cloud-based virtual production environment 104.

It is also noted that "multicast" is a term used to describe communication in which information is sent from one or more points to a set of other points. In this case there may be one or more senders, and the information is distributed to a group of receivers. One example of an application which may use multicast is a video server sending out networked TV channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. Multicast, such as Internet Protocol (IP) multicast, for example, provides dynamic many-to-many connectivity between one or more senders and a group of receivers.

In cloud-based computing environments, whether they are public or private, multicast flow management has typically been impermissible due in part to the unpredictable demands that multicast signals can place on cloud bandwidth. However, it is contemplated that cloud-based virtual production environment 104 may evolve to accommodate multicast flow management. Consequently, in some implementations cloud production media flows 122*a* and post-production cloud media flows 122*b* may be multicast media flows. Nevertheless, most present use cases require conversion of multicast production media flows 111*a* into unicast production media flows prior to processing in cloud-based virtual production environment 104. Thus, in some implementations, cloud production media flows 122*a* may be unicast production media flows 122*a*, and post-production cloud media flows 122*b* may be post-production unicast media flows 122*b*.

In contrast to multicast, "unicast" is a term used to describe communication in which information is sent from one point to another point. In this case there is just one sender and one receiver. Unicast transmission, in which a packet is sent from a single source to a specified destination, is a predominant form of transmission on local area networks (LANs) and within the Internet. All LANs, such as Ethernet, for example, as well as IP networks, support the unicast transfer mode. Examples of the standard unicast applications supported by LANs and IP networks include Hypertext Transfer Protocol (HTTP). Simple Mail Transfer Protocol (SMTP). File Transfer Protocol (FTP), and Telnet, each of which employs TCP.

Hybrid cloud-based media production system 100 provides an exemplary framework by which on-premises production environment 102 can scale larger by expanding into cloud-based virtual production environment 104. That expansion may include the following:

1) Media-over-IP multicast production media flows 111*a* are converted to unicast or other cloud permissible production media flows 122*a* as they move into cloud-based virtual production environment 104.

2) SDNO 130 extends into cloud-based virtual production environment 104 from on-premises production environment 102 to manage cloud production media flows 122*a* in cloud-based virtual production environment 104, creating a virtual network managing the bandwidth for cloud production media flows 122*a*, as well as the announce and discovery of cloud-based resources 120. In other words. SDNO 130 enables cloud-based resources 120 for required production processes and manages the connections. In one implementation, this would be accomplished by the cloud providers supplying standard APIs to cloud-based resources 120.

3) Resource manager 132 communicates with SDNO 130, and coordinates and books cloud-based resources 120 required by media workflows, spinning up computing and storage processes as needed, and loading the required applications. Resource manager 132 can additionally manage the licenses for the applications, should additional applications be required. Management of cloud-based resources 120 and licensing may be API based such that resource manager 132 can present a media based dashboard to a user via a graphical user interface (GUI) of hybrid cloud-based media production system 100 (GUI not shown in FIG.

1), while provisioning the appropriate resources from the cloud provider. It is noted that a media workflow may include a media flow corresponding to multicast production media flows 111a or cloud production media flows 122a, as well as information describing the type of content included in the media flow (e.g., pre-recorded content, breaking news, or other live content), the types of production resources required or desirable for processing of the media flow, and/or the source of the media flow or of the media workflow itself, for example. Thus, a media workflow may include media content as well as production data describing the media content and one or more other parameters of the production workflow for processing the media content.

4) Priority-based production load balancer 140 can communicate with resource manager 132 to allocate production resources provisioned by resource manager 132 to the media workflows based on the priority of content included in those workflows, as well as the distribution schedule for content feeds corresponding to those workflows. Priority-based production load balancer 140 may add a schedule and/or a priority into its load balancing algorithms. Media and broadcast applications almost always have a schedule including predetermined "on-air" times. A show or other content feed with a particular airtime will typically have a number of applications running to produce the feed, including video playback, graphics insertion, audio processing, and the like. Utilizing the schedule information as an input to the load balancing algorithms advantageously enables priority-based production load balancer 140 to prioritize one set of applications over others, while providing all of the resources required for the content feed. Additionally there is the potential for "Breaking News" or other high priority content, as determined by a control room (described below), which is typically not pre-recorded. In that instance, direct intervention by the load balancer is needed to immediately set aside the resources required for that Breaking News or other high priority content.

Collaboration between resource manager 132 and priority-based production load balancer 140, which may be an automated process, enables intelligent, media-focused, priority-based scheduling and utilization of resources, combined with efficient usage. That is to say, in contrast to conventional load balancers that respond to the availability of compute resource without regard to the nature of the workflows being processed, priority-based production load balancer 140 may advantageously allocate available compute resources to media workflows based on the content and scheduling associated with each workflow.

Figure 2:
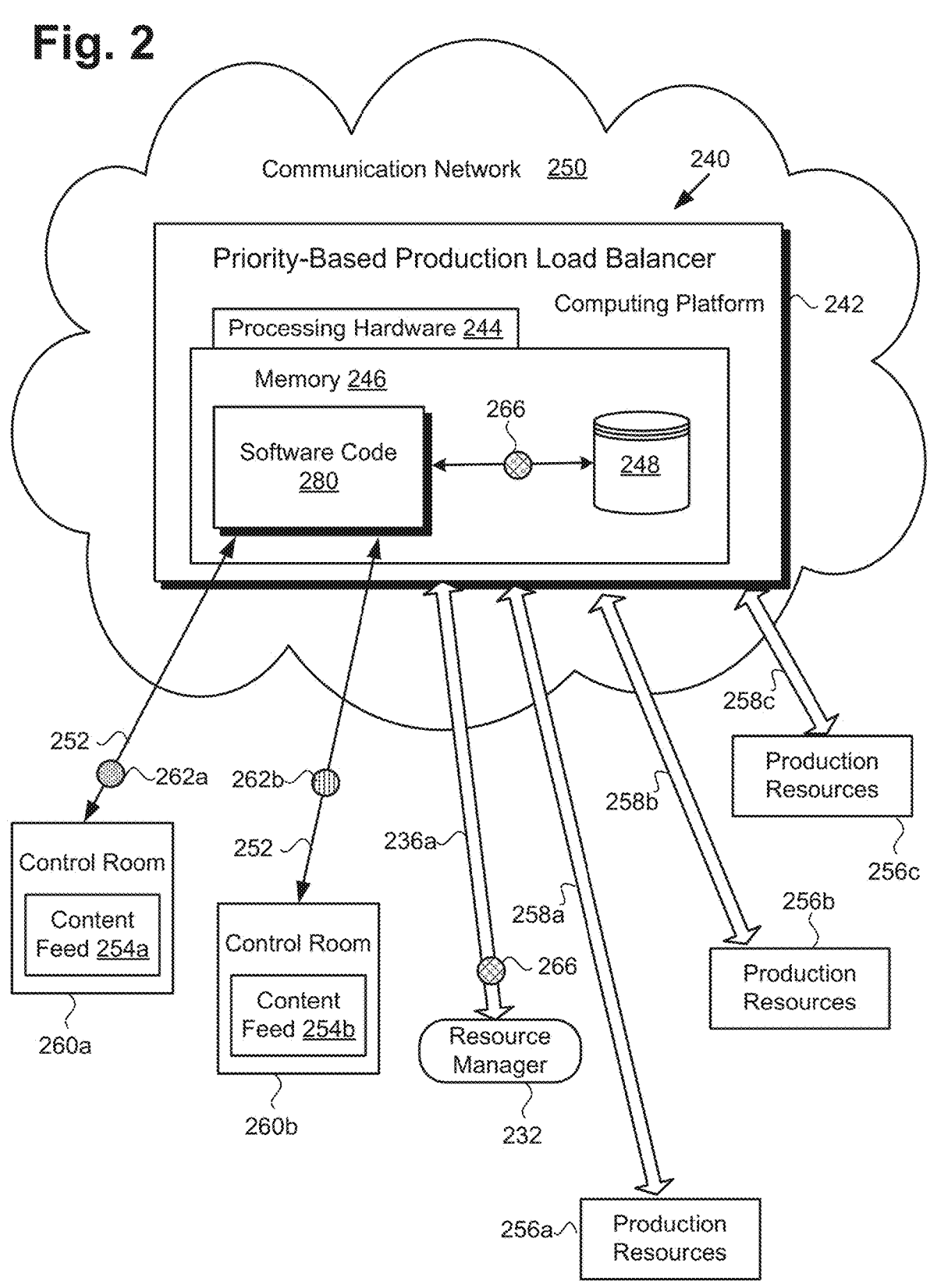
FIG. 2 shows a diagram of a priority-based production load balancer suitable for use as part of the system of FIG. 1, according to one exemplary implementation.

FIG. 2 shows exemplary priority-based production load balancer 240, according to one implementation. As shown in FIG. 2, priority-based production load balancer 240 includes computing platform 242 having processing hardware 244 and memory 246 implemented as a computer-readable non-transitory storage medium. According to the present exemplary implementation, memory 246 stores software code 280 and scheduling database 248.

As further shown in FIG. 2, priority-based production load balancer 240 is implemented within a use environment including communication network 250, resource manager 232, production control room 260a (hereinafter "control room 260a"), production control room 260b (hereinafter "control room 260b"), and production resources 256a, 256b, and 256c, which may be any combination of cloud-based and on-premises hardware or software resources. In addition, FIG. 2 shows network communication links 252 communicatively coupling control rooms 260a and 260b with priority-based production load balancer 240 via communication network 250, as well as resource manager API 236a, and APIs 258a, 258b, and 258c supporting communications between priority-based production load balancer 240 and respective production resources 256a, 256b, and 256c. Also shown in FIG. 2 are content feed 254a provided as a distribution feed by control room 260a, content feed 254b provided as a distribution feed by control room 260b, distribution schedule 266 for content feed 254a, production data 262a, and production data 262b.

It is noted that priority-based production load balancer 240, resource manager 232, and resource manager API 236a correspond respectively in general to priority-based production load balancer 140, resource manager 132, and resource manager API 136a, in FIG. 1. That is to say, priority-based production load balancer 140, resource manager 132, and resource manager API 136a may share any of the characteristics attributed to respective priority-based production load balancer 240, resource manager 232, and resource manager API 236a by the present disclosure, and vice versa.

It is further noted that control rooms 260a and 260b may be remote from priority-based production load balancer 240. Furthermore, although FIG. 2 depicts two control rooms 260a and 260b providing two distribution feeds as respective content feeds 254a and 254b, that representation is provided merely in the interests of conceptual clarity. More generally, priority-based production load balancer 240 may be communicatively coupled to a single control room, or to more than two control rooms, such as tens, hundreds, or thousands of control rooms. Moreover, in various implementations, one or both of control rooms 260a and 260b may be used to distribute multiple content feeds corresponding respectively to each of content feeds 254a and 254b, either serially, in parallel (i.e., substantially concurrently), or as a combination of serial and parallel content feeds.

Content feed 254 may include AV content in the form of a video game, a movie, or episodic programming content including streamed episodic content or broadcasted episodic content, for example. Content feed 254 may include a high-definition (HD) or ultra-HD (UHD) baseband video signal with embedded audio, captions, timecode, and other ancillary content and metadata, such as ratings and parental guidelines. In some implementations, content feed 254 may be provided by control room 260 utilized by a network affiliate of a TV broadcast network or other media distribution entity (e.g., a movie studio, a streaming platform, etc.), utilizing secondary audio programming (SAP) or Descriptive Video Service (DVS), for example. Moreover, in some implementations, content feed 254 may be or include live content.

With respect to the representation of priority-based production load balancer 240 shown in FIG. 2, it is noted that although software code 280 and scheduling database 248 are depicted as being stored in memory 246 for conceptual clarity, more generally, memory 246 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 244 of computing platform 242. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 2 depicts software code 280 and scheduling database 248 as being mutually co-located in memory 246, that representation is also merely provided as an aid to conceptual clarity. More generally, priority-based production load balancer 240 may include one or more computing platforms, such as computer servers for example, which may be co-located, or may form an interactively linked but distributed system, such as a cloud-based system, for instance. As a result, processing hardware 244 and memory 246 may correspond to distributed processor and memory resources within priority-based production load balancer 240. Thus, it is to be understood that software code 280 and scheduling database 248 may be stored remotely from one another within the distributed memory resources of priority-based production load balancer 240. Moreover, in some implementations, scheduling database 248 may be omitted from priority-based production load balancer 240.

Processing hardware 244 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 242, as well as a Control Unit (CU) for retrieving programs, such as software code 280, from memory 246, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 242 may correspond to one or more web servers, accessible over a packet-switched network such as the Internet, for example. Alternatively, computing platform 242 may correspond to one or more computer servers supporting a wide area network (WAN), LAN, or included in another type of limited distribution or private network. As yet another alternative, in some implementations, priority-based production load balancer 240 may be implemented virtually, such as in a data center. For example, in some implementations, priority-based production load balancer 240 may be implemented in software, or as virtual machines.

Figure 3:
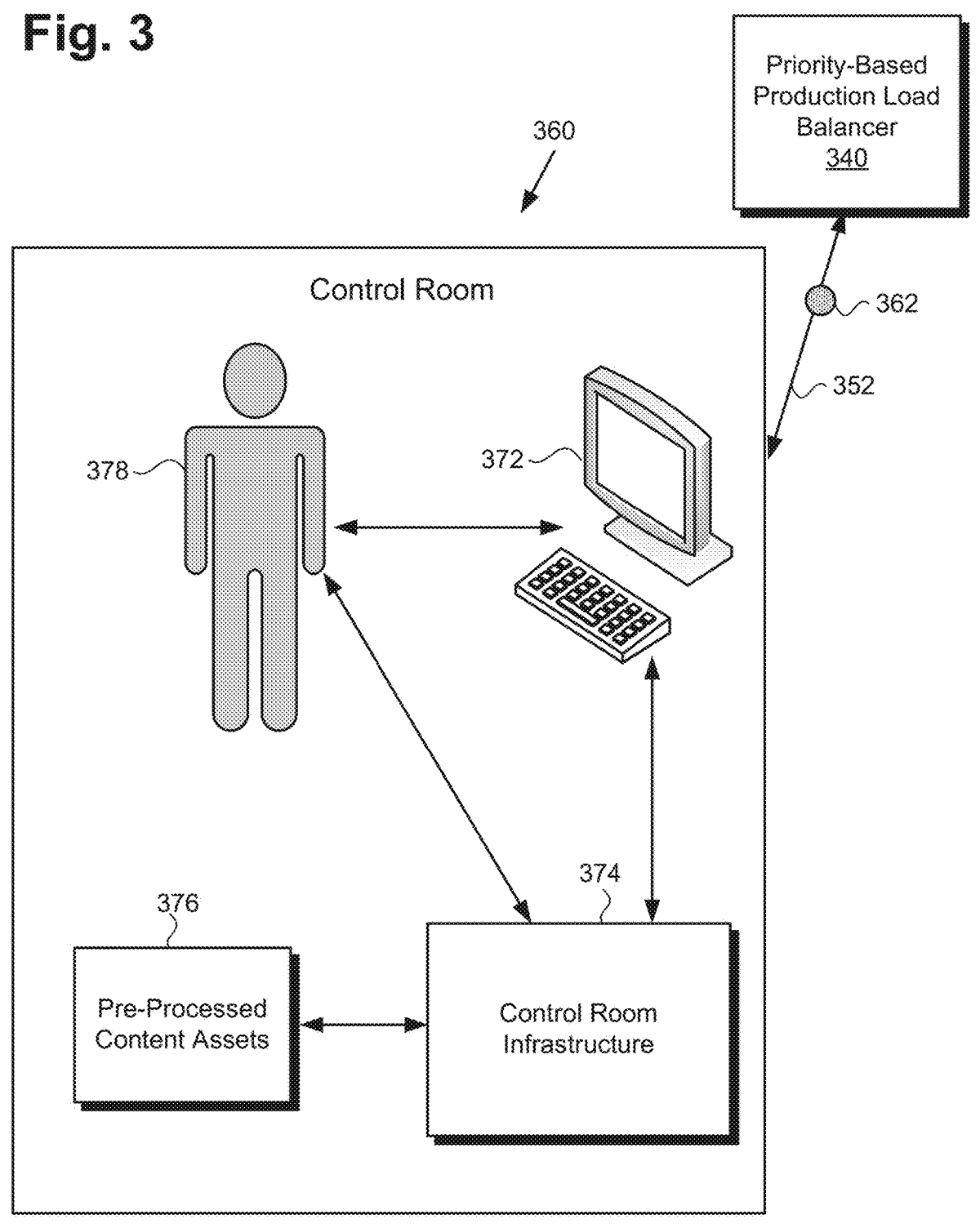

Referring now to FIG. 3. FIG. 3 shows a more detailed example of production control room 360 (hereinafter "control room 360"), according to one exemplary implementation. According to the example shown in FIG. 3, control room 360 includes remote user interface 372, control infrastructure 374, and pre-processed content assets 376. In addition, FIG. 3 shows human resource 378, corresponding to the contributions of one or more highly trained editors, producers, and/or technicians, for example. As shown in FIG. 3, control room 360 is linked to priority-based production load balancer 340 through remote user interface 372 and network communication link 352. Also shown in FIG. 3 is production data 362 received by priority-based production load balancer 340 from control room 360.

Control room 360 and production data 362 correspond respectively in general to either or both of control room(s) 260a/260b and either or both of production data 262a/262b, in FIG. 2. That is to say, control room(s) 260a/260b and production data 262a/262b may share any of the characteristics attributed to respective control room 360 and production data 362 by the present application, and vice versa. In addition, network communication link 352 corresponds in general to communication links 252, in FIG. 2. Thus, communication links 252 may share any of the characteristics attributed to communication link 352 by the present disclosure, and vice versa. Moreover, priority-based production load balancer 340, in FIG. 3, corresponds in general to priority-based production load balancer 140/240 in FIGS. 1 and 2, and all of those corresponding features may share the characteristics attributed to any one of those features by the present disclosure.

It is noted that control room 260a/260b/360 may represent a physically discrete location including hardware and software infrastructure elements as control infrastructure 374. According to one aspect, for example, control room 260a/260b/360 may be analogous to a physical, "brick-and-mortar," control room used for post-production editing and distribution of content feed 254a/254b in a conventional linear assembly model. However, in some implementations, control room 260a/260b/360 may represent an infrastructure resource that is sharable.

Although control room 260a/260b/360 is represented as a single, physically localized, control center in FIGS. 2 and 3, that characterization is merely to simplify its conceptual presentation. More generally, control room 260a/260b/360 may correspond to a plurality of geographically remote control rooms interactively linked with priority-based production load balancer 140/240/340 and providing one or more shared infrastructure resources for use in assembling content feed 254a/254b for distribution.

Pre-processed content assets 376, in FIG. 3, may include "canned" content, such as previously produced programming content, advertising content, or promotional content, for example, eligible for inclusion in content feed 254a/254b. In addition to, or in lieu of, the features attributed to control room 260a/260b/360 by the representation shown in FIG. 3, various implementations of control room 260a/260b/360 may include other features, also interactively linked to priority-based production load balancer 140/240/340 through remote user interface 372, and configured to provide, for instance, scheduling, traffic control, billing, feed monitoring, automation management, graphics provisioning, captioning data, secondary audio programming such as foreign language and descriptive video enhancements, audio voice over, and management of near-live or live content.

Figure 4A:
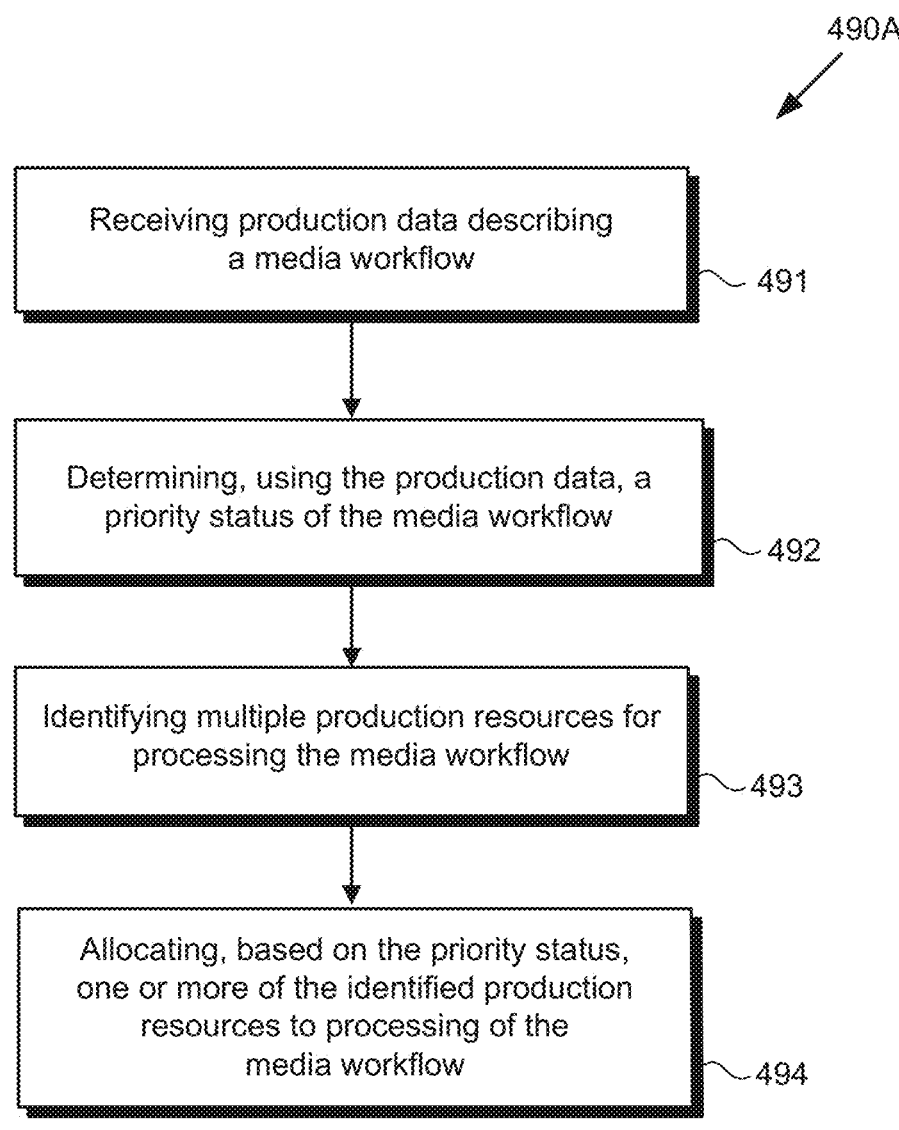
FIG. 4A shows a flowchart outlining an exemplary method for performing priority-based production load balancing, according to one implementation.

The functionality of priority-based production load balancer 140/240/340 and software code 280 will be further described by reference to FIG. 4A. FIG. 4A shows flowchart 490A presenting an exemplary method for performing priority-based production load balancing, according to one implementation. With respect to the method outlined in FIG. 4A, it is noted that certain details and features have been left out of flowchart 490A in order not to obscure the discussion of the inventive features in the present application.

Referring now to FIG. 4A in combination with FIGS. 1, 2, and 3 flowchart 490A may begin with receiving production data 262a/362 or 262b/362 describing a media workflow (e.g., a workflow corresponding to any of multicast production media flows 111*a* or cloud production media flows 122*a*) (action 491). Production data 262*a*/362 or 262*b*/362 may identify the type of content included in the media workflow (e.g., pre-recorded content, breaking news, or other live content), the types of production resources required or desirable for processing of that content, and the source of the content or of the media workflow itself, for example. Referring to FIGS. 2 and 3, in some implementations, production data 262*a*/362 may be received by priority-based production load balancer 240/340 from control room 260*a*/360, via communication network 250 and network communication links 252/352. Alternatively, or in addition, in some implementations, production data 262*b*/362 may be received by priority-based production load balancer 240 from control room 260*b*/360, via communication network 250 and network communication links 252. Production data 262*a*/362 or 262*b*/362 may be received in action 491 by software code 280, executed by processing hardware 244 of priority-based production load balancer 140/240/340.

Flowchart 490A further includes determining, using production data 262*a*/362 or 262*b*/362, a priority status of the media workflow described by production data 262*a*/362 or 262*b*/362 (action 492). As noted above, production data 262*a*/362 or 262*b*/362 may identify the content included in the media workflow it describes as pre-recorded content or live content. In some implementations, action 492 may include identifying, using production data 262*a*/362 or 262*b*/362, the content type of the content included in the media workflow. In those implementations, the priority status of the media workflow described by production data 262*a*/362 or 262*b*/362 may be determined based on that content type. For example, a media workflow including live content may be accorded a higher priority than one including only pre-recorded content.

Among media workflows including live content, the priority status accorded each media workflow may depend on the relative urgency of the live content. For example, live content in the form of breaking news may be deemed more urgent, and consequently be accorded higher priority, than live content in the form of a sporting event. In some implementations, the urgency of live content may be signified by application of a predetermined score, such as an integer value of one (lowest urgency live content) to five (highest urgency live content), for example. Such a score may be assigned by the control room providing the content feed that includes the live content, and may be included in production data 262*a*/362 and/or 262*b*/362. It is noted that techniques for prioritizing content and coordinating its presentation are described in U.S. patent application Ser. No. 17/466,932, titled "Systems and Methods to Determine When to Rejoin a Live Media Broadcast after an Interruption," and filed on Sep. 3, 2021, which is hereby incorporated fully by reference into the present application.

Among media workflows including only pre-recorded content, the priority status accorded each media workflow may depend on the details of its particular scheduling. For example, a media workflow corresponding to content feed 254*a* may have a priority status lower than media workflows corresponding to content feeds scheduled for distribution, i.e., by being broadcast or streamed, before the scheduled distribution of content feed 254*a*. Analogously, the media workflow corresponding to content feed 254*a* may have a priority status higher than media workflows corresponding to content feeds scheduled for distribution after the scheduled distribution of content feed 254*a*.

Thus, in some implementations, action 492 may include obtaining distribution schedule 266 for content feed 254*a* corresponding to the media workflow described by production data 262*a*/362, and further basing determination of the priority status of that media workflow on distribution schedule 266. In some implementations, as shown in FIG. 2, priority-based production load balancer 240 may include scheduling database 248. In those implementations, distribution schedule 266 for content feed 254*a* may be obtained from scheduling database 248. Alternatively and as also shown in FIG. 2, in some implementations, distribution schedule 266 for content feed 254*a* may be obtained from resource manager 232 communicatively coupled to priority-based production load balancer 240 via resource manager API 236*a*.

Alternatively, the types of production resources required or desirable for processing of the media workflow described by the production data received in action 491 may affect determination of its priority status. For example, in various use cases, media workflows requiring production resources that are scarce, expensive, or only periodically available may receive higher priority, or lower priority, than other media workflows requiring production resources that are more readily or consistently available, or are less costly to use. In any event, the determination, in action 492, of the priority status of the media workflow described by production data 262*a*/362 or 262*b*/362 may be performed by software code 280, executed by processing hardware 244 of priority-based production load balancer 140/240/340.

Flowchart 490A further includes identifying production resources (e.g., production resources 256*a*, 256*b*, and 256*c*) for processing the media workflow described by the production data received in action 491 (action 493). Action 493 may be performed by software code 280, executed by processing hardware 244 of priority-based production load balancer 140/240/340. As noted above, the production data received in action 491 may identify the types of production resources required or desirable for processing of the media workflow it describes. However, and as further noted above, resource manager 132/232 may be responsible for licensing and procurement of the particular production resources available for use in processing media workflows. Thus, in some implementations, action 493 may be performed by software code 280, executed by processing hardware 244 of priority-based production load balancer 140/240/340, and using resource manager 132/232 communicatively coupled to priority-based production load balancer 140/240/340.

Flowchart 490A further includes allocating, based on the priority status of the media workflow described by the production data received in action 491, one or more of the production resources identified in action 493 (hereinafter "production resource(s)") to processing of that media workflow (action 494). Allocation of the production resource(s) in action 494 may include communicating with one or more of production resources 256*a*, 256*b*, and 256*c* via respective APIs 258*a*. 258*b*, and 258*c*. It is noted that the production resource(s) allocated in action 494 may include one or more of computing hardware or a software application or applications. Moreover, in various implementations, the production resource(s) allocated in action 494 may include one or more of a cloud-based resource or an on-premises resource of one of a provider of the production data received in action 491 or an affiliate of the provider (e.g., control room 260*a*/260*b*/360 or an affiliated control room).

Allocation of the production resource(s) to processing of the media workflow described by production data 262*a*/362 or 262*b* on the basis of the priority status of that media workflow may be performed in action 494 by software code 280, executed by processing hardware 244 of priority-based production load balancer 140/240/340. As discussed above, priority-based production load balancer 140/240/340 may add a schedule and a priority into its load balancing algorithms. A media workflow for a content feed having a particular airtime will typically have a number of applications running to produce the feed, including video playback, graphics insertion, audio processing, and the like. Utilizing the priority status of the media workflow as an input to the load balancing algorithms advantageously enables priority-based production load balancer 140 to prioritize some applications over others, while providing all of the production resources required for the content feed to succeed.

With respect to the actions listed in flowchart 490A, it is noted that actions 491, 492, 493, and 494 (hereinafter "actions 491-494") may be performed for multiple different media workflows corresponding to any of multicast production media flows 111a or cloud production media flows 122a, such as tens, hundreds, or thousands of such media workflows, for example. In addition, actions 491-494 may be performed for some or all of such media flows in parallel, i.e., substantially concurrently. Moreover, in some implementations actions 491-494 may be performed in an order other than that represented in flowchart 490A. For example, in some use cases, it may be possible to determine the priority status of a media workflow before the production data describing that media workflow is received in action 491.

Figure 4B:
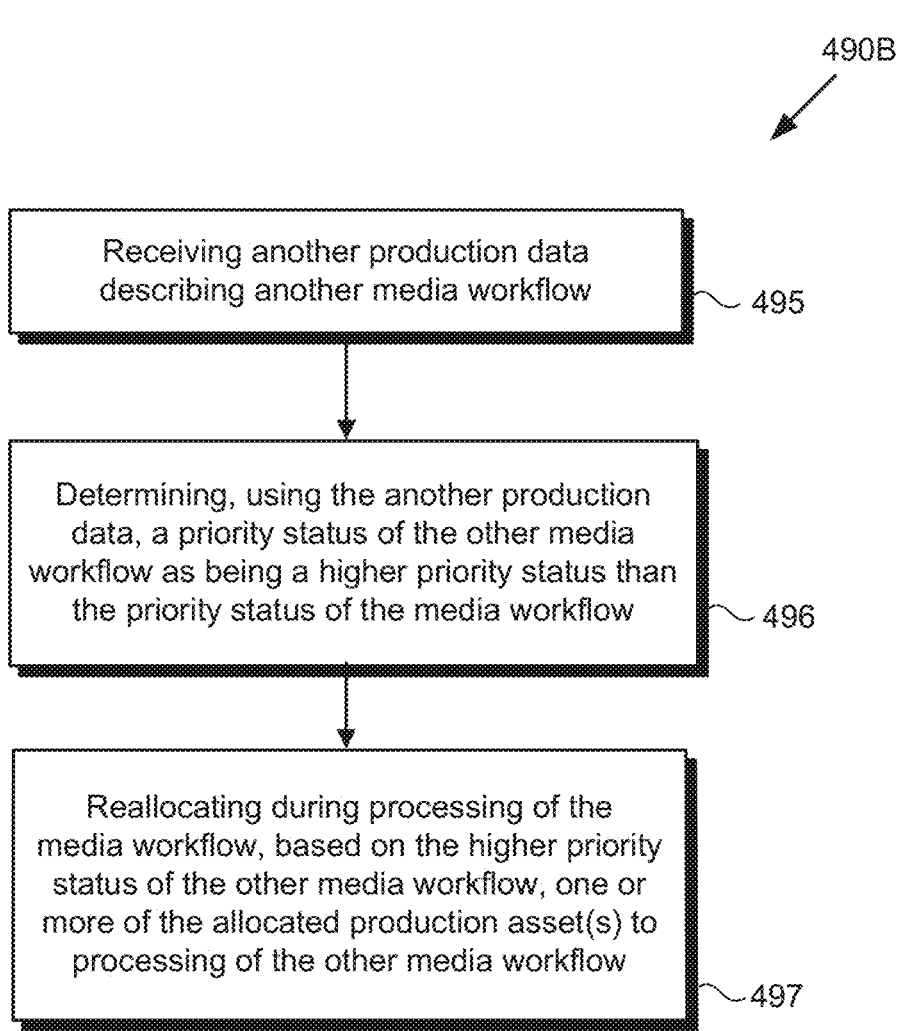
FIG. 4B shows a flowchart outlining exemplary additional actions for extending the method outlined in FIG. 4A.

In some implementations, flowchart 490A may conclude with action 494 described above. However, in other implementations, the method outlined in FIG. 4A may include additional actions. Referring to FIG. 4B, FIG. 4B shows flowchart 490B outlining exemplary additional actions for extending the method outlined in FIG. 4A. With respect to the actions described in FIG. 4B, it is noted that certain details have been left out of flowchart 490B in order not to obscure the discussion of the inventive features in the present application. It is further noted that the actions included in flowchart 490B are described below by reference to an exemplary use case in which production data 262a/362 describing a media workflow corresponding to content feed 254a is received in action 491 of flowchart 490A.

Referring now to FIG. 4B in combination with FIG. 2, flowchart 490B may begin with receiving another production data (hereinafter "production data 262b") describing another media workflow (action 495). As noted above, production data 262b may identify the type of content included in the media workflow it describes, the types of production resources required or desirable for processing of the media workflow, and the source of the media workflow, for example. Referring to the exemplary implementation shown in FIG. 2, in one implementation, production data 262b may be received by priority-based production load balancer 240 from control room 260b, via communication network 250 and network communication links 252. Production data 262b may be received in action 496 by software code 280, executed by processing hardware 244 of priority-based production load balancer 240.

Flowchart 490B further includes determining, using production data 262b received in action 495, the priority status of the other media workflow described by production data 262b as being a higher priority status than the priority status of the media workflow described by production data 262a (action 496). The determination, in action 496, that the priority status of the media workflow described by production data 262b is higher than the priority status of the media workflow described by production data 262a may be performed by software code 280, executed by processing hardware 244 of priority-based production load balancer 240, in a manner analogous to that described above by reference to action 492 of flowchart 490A.

Flowchart 490B further includes reallocating during processing of the media workflow described by production data 262a, one or more of the production resource(s) allocated to that media workflow in action 494, based on the higher priority status of the other media workflow described by production data 262b, to processing of that other media workflow (action 497). Action 497 may be performed by software code 280, executed by processing hardware 244 of priority-based production load balancer 240 in a manner analogous to that described above by reference to action 494 in flowchart 490A.

It is noted that the reallocation of production resources described by reference to action 497 is predicated on such production resources being limited. Where abundant production resources are available, identification of the priority status of the media workflow described by production data 262b as being higher than the priority status of the media workflow described by production data 262a may not affect the production resource(s) allocated to the media workflow described by production data 262a. Rather, in use cases in which production resources are abundant, the media workflow described by production data 262b may simply have more production resources allocated to it than the production resource(s) allocated to the media workflow described by production data 262a.

With respect to the method outlined by flowcharts 490A and 490B, it is noted that, like actions 491-494, actions 495, 496, and 497 (hereinafter "actions 495-497") may be performed for multiple different media workflows corresponding to any of multicast production media flows 111a or cloud production media flows 122a, such as tens, hundreds, or thousands of such media workflows, for example. In addition, like actions 491-494, actions 495-497 may be performed for some or all of such media flows in parallel. i.e., substantially concurrently. Also, in some implementations actions 495-497 may be performed in an order other than that represented in flowchart 490B. For example, in some use cases, it may be possible to determine the priority status of the media workflow described by production data 262b before production data 262b is received in action 495. Furthermore, actions 491-494, actions 495-497, or actions 491-494 and 495-497, may be performed in an automated process from which human participation may be omitted.

Thus, the present application discloses priority-based production load balancing solutions that overcome the drawbacks and deficiencies in the conventional art. As described above, the priority-based production load balancer disclosed in the present application may add a schedule and a priority into its load balancing algorithms. Providing the schedule information as a source to the load balancing algorithms advantageously enables the priority-based production load balancer to prioritize some applications over others, while providing all of the production resources required for a show or other content feed to succeed. In addition, collaboration between a resource manager and the priority-based production load balancer disclosed herein enables intelligent, media-focused, priority-based scheduling and utilization of resources, combined with efficient usage. Thus, in contrast to conventional load balancers that respond to the availability of compute resource without regard to the nature of the workflows being processed, the priority-based production load balancing solution disclosed herein can advantageously allocate available compute resources to media workflows based on the content and scheduling associated with each workflow.

Furthermore, and as noted above, the priority-based load management solution disclosed in the present application may be implemented as an automated solution. Such automation is important because the actions described by reference to FIGS. 4A and 4B cannot be performed by a human mind in a timely manner. For example, the perishability or urgency of content is often such that a human being would be unable to make load balancing decisions in real-time (i.e., without significant delay), which may render high priority content irrelevant or otherwise of substantially reduced value to the consumers of such content.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a priority-based production load balancer including a computing platform having a processing hardware and a memory storing a software code and a scheduling database;
the processing hardware of the priority-based production load balancer configured to execute the software code to:
receive production data describing a media workflow including media content and the production data, the production data identifying production hardware and software resources for processing the media content;
obtain, from the scheduling database stored in the memory of the priority-based production load balancer, a distribution schedule for transmission or broadcast of a plurality of content feeds, wherein a first content feed of the plurality of content feeds corresponds to the media workflow, the distribution schedule including a predetermined transmission or broadcast time for each of the plurality of content feeds;
determine, based on a scarcity and an expense of one or more of the production hardware and software resources identified by the production data, and using the distribution schedule, a priority status of the media workflow;
identify, using the production data, a plurality of the production hardware and software resources for processing the media content; and
load balance processing of the media workflow by allocating, based on the priority status and a respective availability of each of the plurality of production hardware and software resources, at least one of the plurality of production hardware and software resources for use in processing of the media content.

2. The system of claim 1, further comprising:
a resource manager communicatively coupled to the priority-based production load balancer, wherein the plurality of production hardware and software resources for processing the media content are identified using the resource manager.

3. The system of claim 1, wherein the allocated at least one of the plurality of production hardware and software resources comprises one or more of a cloud or on-premises computing hardware or a cloud or on-premises software application.

4. The system of claim 1, wherein the allocated at least one of the plurality of production hardware and software resources comprises one or more of a cloud-based resource or an on-premises resource of one of a provider of the production data or an affiliate of the provider.

5. The system of claim 1, wherein the processing hardware of the priority-based production load balancer is further configured to execute the software code to:
receive another production data describing another media workflow, wherein a live content feed corresponds to the another media workflow;
determine, using the another production data, a priority status of the another media workflow corresponding to the live content feed is a higher priority status than the priority status of the media workflow corresponding to the first content feed; and
load balance processing of the media workflow and the another media workflow by reallocating during processing of the media content of the media workflow, based on the higher priority status of the another media workflow, one or more of the allocated at least one of the plurality of production hardware and software resources for processing of the another media workflow.

6. A computer-readable non-transitory storage medium having stored thereon instructions, which when executed by a processing hardware, instantiate a method comprising:
receiving production data describing a media workflow including media content and the production data, the production data identifying production hardware and software resources for processing the media content;
obtaining, from a scheduling database stored in a memory of a priority-based production load balancer, a distribution schedule for transmission or broadcast of a plurality of content feeds, wherein a first content feed of the plurality of content feeds corresponds to the media workflow, the distribution schedule including a predetermined transmission or broadcast time for each of the plurality of content feeds;
determining, based on a scarcity and an expense of one or more of the production hardware and software resources identified by the production data, and using the distribution schedule, a priority status of the media workflow
identifying, using the production data, a plurality of production hardware and software resources for processing the media content; and
load balance processing of the media workflow by allocating, based on the priority status and a respective availability of each of the plurality of production hardware and software resources, at least one of the plurality of production hardware and software resources for processing of the media content.

7. The computer-readable non-transitory storage medium of claim 6, wherein the method is executed by a priority-based production load balancer, and wherein the plurality of production hardware and software resources for processing the media content are identified using a resource manager communicatively coupled to the priority-based production load balancer.

8. The computer-readable non-transitory storage medium of claim 6, wherein the allocated at least one of the plurality of production hardware and software resources comprises one or more of a cloud or on-premises computing hardware or a cloud or on-premises software application.

9. The computer-readable non-transitory storage medium of claim 6, wherein the allocated at least one of the plurality of production hardware and software resources comprises one or more of a cloud-based resource or an on-premises resource of one of a provider of the production data or an affiliate of the provider.

10. The computer-readable non-transitory storage medium of claim 6, the method further comprising:

receiving another production data describing another media workflow, wherein a live content feed corresponds to the another media workflow;

determining, using the another production data, a priority status of the another media workflow corresponding to the live content feed is a higher priority status than the priority status of the media workflow corresponding to the first content feed; and load balancing processing of the media workflow and the another media workflow by reallocating during processing of the media content of the media workflow, based on the higher priority status of the another media workflow, one or more of the allocated at least one of the plurality of hardware and software resources for processing of the another media workflow.

11. A method for use by a priority-based production load balancer including a computing platform having a processing hardware and a memory storing a software code and a scheduling database, the method comprising:

receiving, by the software code executed by the processing hardware, production data describing a media workflow including media content and the production data, the production data identifying production hardware and software resources for processing the media content;

obtaining, by the software code executed by the processing hardware, a distribution schedule for transmission or broadcast of a plurality of content feeds, wherein a first content feed of the plurality of content feeds corresponds to the media workflow, the distribution schedule including a predetermined transmission or broadcast time for each of the plurality of content feeds;

determining, by the software code executed by the processing hardware based on a scarcity and an expense of one or more of the production hardware and software resources identified by the production data, and using the distribution schedule, a priority status of the media workflow;

identifying, by the software code executed by the processing hardware and using the production data, a plurality of production hardware and software resources for processing the media content; and load balancing processing of the media workflow by allocating, by the software code executed by the processing hardware based on the priority status and a respective availability of each of the plurality of production hardware and software resources, at least one of the plurality of production hardware and software resources for processing of the media content.

12. The method of claim 11, further comprising:

receiving, by the software code executed by the processing hardware, another production data describing another media workflow, wherein a live content feed corresponds to the another media workflow;

determining, by the software code executed by the processing hardware and using the another production data, a priority status of the another media workflow corresponding to the live content feed is a higher priority status than the priority status of the media workflow corresponding to the first content feed; and load balancing processing of the media workflow and the another media workflow by reallocating during processing of the media content of the media workflow, by the software code executed by the processing hardware based on the higher priority status of the another media workflow, one or more of the allocated at least one of the plurality of hardware and software resources for processing of the another media workflow.

13. The system of claim 5, wherein the live content feed is a breaking news feed.

14. The computer-readable non-transitory storage medium of claim 10, wherein the live content feed is a breaking news feed.

15. The method of claim 12, wherein the live content feed is a breaking news feed.

16. The method of claim 11, wherein the method is executed by a priority-based production load balancer, and wherein the plurality of production hardware and software resources for processing the media content are identified using a resource manager communicatively coupled to the priority-based production load balancer.

17. The method of claim 11, wherein the allocated at least one of the plurality of production hardware and software resources comprises one or more of a cloud-based resource or an on-premises resource of one of a provider of the production data or an affiliate of the provider.

18. The method of claim 11, wherein the allocated at least one of the plurality of production hardware and software resources comprises one or more of a cloud or on-premises computing hardware or a cloud or on-premises software application.

19. The method of claim 11, wherein the plurality of content feeds are pre-recorded content feeds.

20. The system of claim 1, wherein the plurality of content feeds are pre-recorded content feeds.

21. The computer-readable non-transitory storage medium of claim 6, wherein the plurality of content feeds are pre-recorded content feeds.

* * * * *